(12) United States Patent
Frenkil

(10) Patent No.: US 7,774,728 B2
(45) Date of Patent: Aug. 10, 2010

(54) METHOD THAT ALLOWS FLEXIBLE EVALUATION OF POWER-GATED CIRCUITS

(75) Inventor: Gerald L. Frenkil, Concord, MA (US)

(73) Assignee: Apache Design Solutions, Inc., San Jose, CA (US)

( * ) Notice: Subject to any disclaimer, the term of this patent is extended or adjusted under 35 U.S.C. 154(b) by 0 days.

(21) Appl. No.: 11/150,031

(22) Filed: Jun. 10, 2005

(65) Prior Publication Data

US 2006/0117282 A1 Jun. 1, 2006

Related U.S. Application Data

(63) Continuation-in-part of application No. 10/998,204, filed on Nov. 26, 2004, now Pat. No. 7,590,962.

(51) Int. Cl.
*G06F 17/50* (2006.01)
(52) U.S. Cl. ............... 716/6; 716/1; 716/11; 716/12
(58) Field of Classification Search ............ 716/1, 716/6, 11, 12
See application file for complete search history.

(56) References Cited

U.S. PATENT DOCUMENTS

| 7,080,341 | B2 * | 7/2006 | Eisenstadt et al. | 716/13 |
| 2005/0091629 | A1 * | 4/2005 | Eisenstadt et al. | 716/13 |
| 2005/0276132 | A1 * | 12/2005 | Severson et al. | 365/202 |
| 2006/0091913 | A1 * | 5/2006 | Bhattacharya | 326/97 |

* cited by examiner

*Primary Examiner*—Thuan Do
(74) *Attorney, Agent, or Firm*—Haynes and Boone, LLP

(57) ABSTRACT

A method and a design automation tool are provided for use in conjunction with designing logic circuits that implement virtual power signals. The method includes providing in a model for each virtual power signal an attribute that distinguishes the virtual power signal from both a logic signal and a power signal. The method also includes one or more circuit analysis, processing and synthesis tool that takes advantage of such an attribute. That is, within the design automation tool, capabilities are provided so that a virtual power signal may be processed in some instances as a logic signal, and at some instance as indistinguishable to a power rail signal or reference.

16 Claims, 2 Drawing Sheets

METHOD THAT ALLOWS FLEXIBLE EVALUATION OF POWER-GATED CIRCUITS

CROSS-REFERENCE TO RELATED APPLICATIONS

This patent application is a continuation-in-part application of—thus claiming priority to—U.S. patent application, entitled "DESIGN METHOD AND ARCHITECTURE FOR POWER GATE SWITCH PLACEMENT", Ser. No. 10/998, 204, filed on Nov. 26, 2004, now U.S. Pat. No. 7,590,962. The disclosure of the Application is hereby incorporated by reference in its entirety.

BACKGROUND OF THE INVENTION

1. Field of the Invention

The present invention relates to a method for designing multi-threshold complementary metal-oxide-semiconductor (MTCMOS) circuits and the physical architecture of the circuits resulting from using such a method. In particular, the present invention relates to a design method to allow flexible simulation and verification of an MTCMOS circuit.

2. Discussion of the Related Art

A significant concern in integrated circuit design is reducing leakage currents. Leakage currents flow in logic circuits from a power supply node into the ground node because the switching characteristics of the transistors in the logic circuits are not ideal (i.e., the transistors cannot be completely shut off).

In MTCMOS circuits, one technique that reduces leakage current is to a place a "power gate" (also known as "power switch" or simply, "switch cell") between the lowest potential terminal of a logic gate (the "virtual ground" reference) and the ground reference. This technique is illustrated schematically in FIG. 1, which shows power gate or switch cell 101 controlling the leakage current path of logic cell 102 to ground. As shown in FIG. 1, logic cell 102 is formed using lower threshold voltage transistors to provide short switching times. The power gate is typically a transistor which has a higher threshold voltage than the threshold voltage of the transistors used to implement the logic cells. The power gate interrupts the leakage current path to ground. When power gate 101 is conducting (i.e., a high voltage is provided at control node 106), a leakage current flows from power supply node 104 through logic cell 102 to virtual ground node 103, and through power gate 101 to true ground node 105. However, during standby (i.e., when a voltage much less than power gate 101's threshold voltage is imposed at control node 106), power gate 101 cuts off the leakage current path from virtual ground node 103 to true ground node 105.

Important concerns that are addressed by a designer of an MTCMOS circuit include:

1. Each logic cell is designed such that power-gating has minimal or little impact on the area and performance characteristics of the logic cell;
2. The logic and switch cells, wires, and connectors are laid out in an area-efficient manner;
3. The functional and timing behaviors of a logic cell are modeled with consideration for the anticipated effects of power gate switching on the logic cell;
4. The timing characteristics of the MTCMOS circuit takes into account the timing paths involving the virtual ground or power signals.
5. The functional behavior of the MTCMOS circuit are simulated with the effects of the virtual ground or virtual power signals;
6. The circuit after power-gates are synthesized and inserted may be verified to be functionally identical to that circuit prior to power gate synthesis;
7. A physical floor plan can be created with consideration for the virtual ground or virtual power networks;
8. The logic cells and switch cells that are connected by the same virtual ground or virtual power signals are placed effectively;
9. Virtual ground networks are effectively routed with the routing of all power, ground, and signal wires;
10. The amount of additional area required by including the virtual ground network or virtual power network are controlled.
11. The overall amount of time required to design and verify the logic, electrical and physical designs, including the design of the virtual ground or the virtual power network, can be minimized.

Conventional design automation techniques treat a virtual ground network or a virtual power network in an MTCMOS circuit as a third power or ground network, in addition to the conventional power and ground networks, so that the functional and timing characteristics related to the switching of such "virtual ground" and "virtual power" reference signals and their impact on the functional and timing characteristics of the rest of the MTCMOS circuit are not modeled.

SUMMARY OF THE INVENTION

The present invention provides a method and a design automation tool that can be used in conjunction with designing logic circuits that implement virtual power signals. The method includes providing in a model for each virtual power signal an attribute that distinguishes the virtual power signal from both a logic signal and a power signal. The method also includes one or more circuit analysis, processing and synthesis tool that takes advantage of such an attribute. That is, within the design automation tool, capabilities are provided so that a virtual power signal may be processed in some instances as a logic signal, and at some instance as indistinguishable to a power rail signal or reference.

According to one embodiment of the present invention, a timing model for the logic circuit incorporates the model for the virtual power signal. In that timing model, a timing relationship is created between the virtual power signal and a logic signal, such as an output signal of the logic circuit. In this manner, the timing characteristics of the virtual power signal can be incorporated into a timing analysis.

According to one embodiment of the present invention, a power model for the logic circuit incorporates the model for the virtual power signal. In that power model, a power consumption of the logic circuit is related to the active and inactive states of the virtual power signal, so that a power analysis can take into consideration the activity of the virtual power signal. Separate analysis of different power domains may also be accomplished.

According to one embodiment of the present invention, the design automation tool may include a formal verification tool for verifying the logic circuit against a synthesized power-gated circuit corresponding to the logic circuit. In one such formal verification tool, a model of the logic circuit is extracted from the synthesized power-gated circuit using the attribute to identify the virtual power signal.

According to one embodiment of the present invention, the design automation toll may provide a power router which routes the virtual power signal in the logic circuit as a power rail. Alternatively, a signal router may be provided to route the virtual power signal in the logic circuit as a signal.

Thus the present invention provides that the functional, timing and electrical operations may be analyzed taking into consideration of the virtual power signals.

The present invention is better understood upon consideration of the detailed description below and the accompanying drawings.

DETAILED DESCRIPTION OF THE PREFERRED EMBODIMENTS

Figure 1:
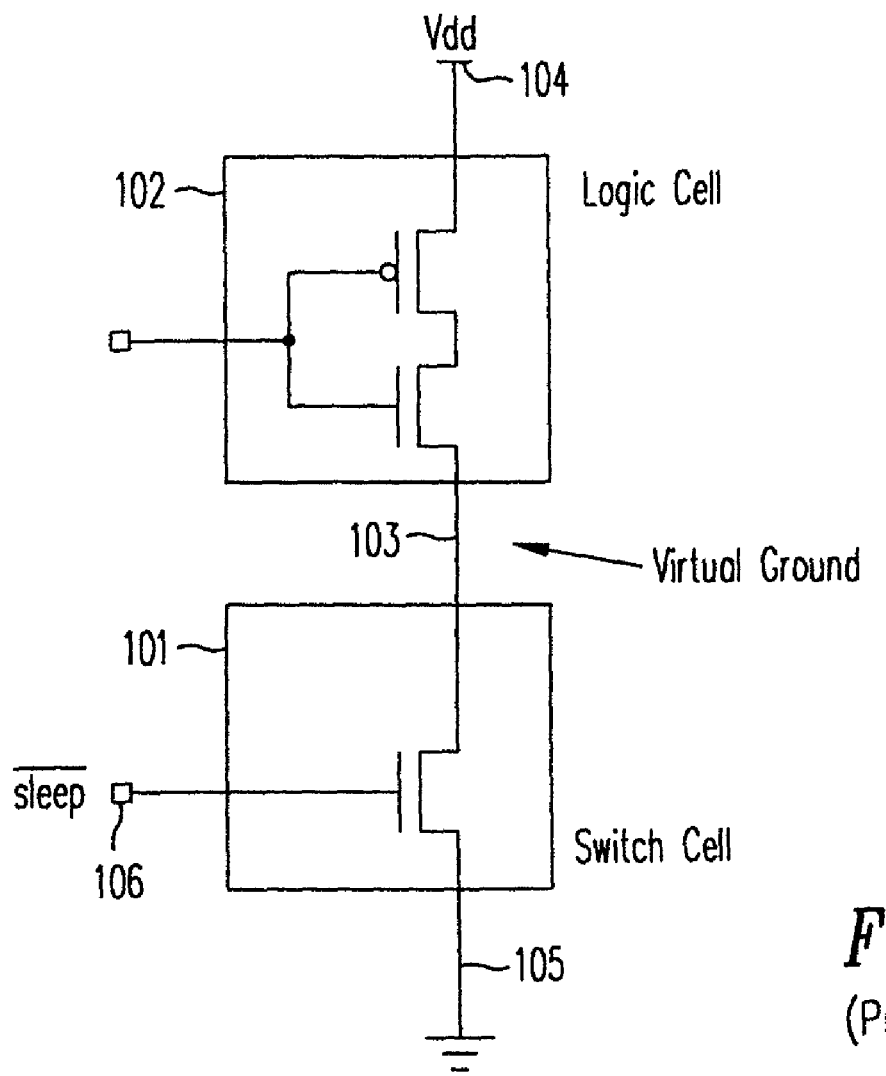
FIG. 1 shows schematically power gate or switch cell 101 controlling the leakage current path of logic cell 102 to ground.

According to the present invention, a design automation method allows a "virtual ground" or "virtual power" network (a "virtual power signal network") to be modeled both as a virtual power signal network and as a signal network. Under the present invention, the design automation system may elect to treat the virtual power signal as a power signal or power rail, in the sense of the conventional power and ground signals, at certain stages of the design process (e.g., during "formal verification," which verifies that the synthesized power-gated circuit is functionally identical to the input non-power gated circuit), and applies power network analysis tools for evaluation and verification. At other stages of the design process, the design automation system may elect to treat the virtual power signal network as a signal network (e.g., logic simulation and timing analysis), and applies signal analysis tools for evaluation and verification. This method provides, among other benefits, placement and routing flexibility, enhanced functional verification capability, simplified overall design flow, and reduced design time.

In this detailed description, the present invention is illustrated by embodiments in which the power gate cells connect the logic cells to a true ground voltage reference. However, the present invention is equally applicable to power gate cells which connect the logic cells to a true power supply voltage reference. (In that case, the terminals connecting the power gates to the logic cells are referred to as "virtual power voltage references"). The present invention is also applicable to a design in which power gate cells that connect logic cells to a true ground voltage reference and power gate cells that connect logic cells to a true power supply voltage references are both used.

According to one embodiment of the present invention, a design automation system of the present invention treats an input signal that is a designated a virtual power signal (i.e., the virtual ground voltage reference or the virtual power voltage reference) in a logic cell as a logic signal, rather than a power supply signal. Such an input signal may be identified, for example, by a boolean "is_virtual_power_signal" attribute associated with the input signal. The functional and timing models of such a logic cell express the effects of the virtual power signal.

Under this approach, the virtual ground is modeled as an input signal which controls the impedance of an output pin (i.e., driven to a logic state '1' or '0', or a high impedance state 'Z'). For example, an inverter logic cell "Inverter" under the present invention may be defined as a 3-port circuit having two input signals I1, VG and an output signal O1, in which the input signal VG has the attribute "is_virtual_power" signal set. For the Inverter functional model, the output O1 may be defined (in a pseudo hardware description language) as follows:

O1=not I1 when {VG='0'} and 'Z' when {VG=not '0'};

This statement provides that the output signal O1 takes on a value equal to the logical complement of input signal I1 (i.e., not I1) when signal VG, the virtual ground signal, is at logic state '0' (i.e., asserted), but takes the value 'Z' of the high impedance state, when the signal VG is other than '0' (e.g., '1' or 'Z'). Alternatively, the virtual ground signal may also be modeled as an input signal that provides combinatorial input control.

Similarly, the timing model in this embodiment includes an "input-to-output timing arc", which expresses the timing relationship between a transition at the virtual ground signal VG and output signal O1.

In this embodiment, a timing analysis tool is modified to include a mode of operation in which a virtual power signal is treated as a logic signal. In that mode of operation, the timing of output signal O1 in the exemplary Inverter cell above takes into consideration both (a) the "input-to-output timing arc" between input signal I1 and output signal O1, and (b) the "input-to-output timing arc" between virtual ground signal VG and output signal O1. The timing analysis tool can also be made to exclude the virtual ground signal VG (e.g., by recognizing the virtual ground signal from inspecting a signal's "is_virtual_power" attribute, and setting the corresponding timing arc to zero) in a more conventional analysis.

A power model of the Inverter logic cell may also include an "input-to-output power arc", which expresses the changes in power consumption in the Inverter logic cell relative to the transition in logic state of virtual ground signal VG. By including virtual power signals in a power mode, the power consumption of the MTCMOS circuit can be more accurately estimated, using any power estimation techniques, such as a static or a dynamic current estimate technique. Examples of suitable current estimate techniques include current averaging, or any of the dynamic current estimation techniques disclosed in U.S. patent application, Ser. No. 10/739,659, entitled "Current Scheduling System and Method For Optimizing Multi-Threshold CMOS Designs," filed on Dec. 17, 2003 and U.S. Pat. No. 6,807,660, "Vectorless Instantaneous Current Estimation", filed on Oct. 1, 2002 and issued on Oct. 19, 2004.

A functional simulation tool can be modified to recognize virtual power signals and to simulate the functional characteristics accordingly. In the exemplary Inverter logic cell above, the functional simulation tool provides the output values of inverter according to the functional description that includes the logic states of virtual ground signal VG.

Because virtual power signals can be recognized and excluded, a tool can be provided that can extract from the synthesized power-gated circuit (e.g., by excluding the virtual ground signals and switch cells) and which compares this extracted circuit with the input circuit (i.e., the logic circuit prior to power-gate synthesis) to determine that the circuits are functionally equivalent. In addition, electrical rule checking can be provided to identify improper or impermissible connections (e.g., a virtual ground signal driving a logic input signal to a functional logic circuit, or a virtual ground signal inadvertently shorted to true ground).

By treating a virtual power signal as a logic signal, the virtual power signals between the switch cells and the logic cells they serve may be routed using any signal router. Alternatively, by treating a virtual power signal as a power rail, the virtual power signals between the switch cells and the logic cells they serve may be routed using any power routing router.

The ability to provide in a single design automation tool the ability to treat a virtual power signal as a logic signal in certain aspects of the design flow, and to treat the virtual ground signal as a ground rail in other aspects of the design flow provide efficiency not previous achieved. For example, portions of an MTCMOS circuit that are in different sleep domains and sleep modes (i.e., active or power saving mode) may be evaluated for timing, function or power, may be evaluated together. Because the virtual power signals of the different domains are different power signals, it may be more appropriate to treat the virtual power signals as logic signals. As another example, the effects of the transient timing and power behavior of a virtual power signal can be evaluated according to the present invention.

Figure 2:
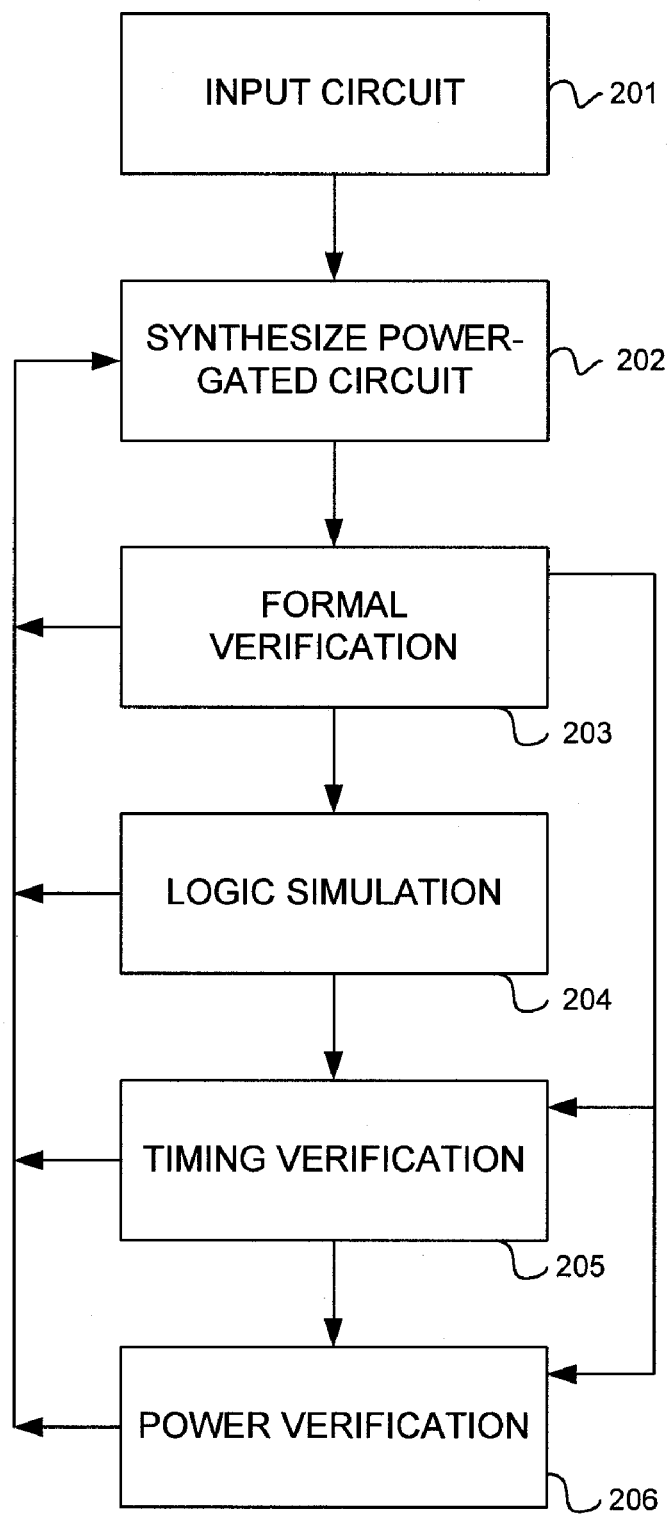
FIG. 2 shows an exemplary design process, according to one embodiment of the present invention.

FIG. 2 shows one exemplary design process 200, in accordance with the present invention. As shown in FIG. 2, design process 200 receives an input logic circuit expressed, for example, in an RTL hardware description language at step 201. At step 202, the input logic circuit is synthesized, placed and routed. During this process, the synthesis tool retrieves from a design library logic cells that can be used to implement the input logic circuit, including logic cells that include as input signals virtual ground signals or virtual power signals. During step 202, the virtual power signals are tagged for reference by subsequent operations that treat virtual power signals either as a power rail or a logic signal. The routing operations at step 202 may route each virtual power signal either a power rail or as a logic signal. In subsequent iterations, the decision to use either technique can be guided by timing and power consideration, based on the timing and power evaluations at step 205 and 206, respectively.

At step 203, the synthesized circuit can be formally verified with the input circuit to ensure that the synthesized circuit is functionally equivalent to the input circuit. As mentioned above, formal verification can be achieved, for example, by extracting from the synthesized circuit and excluding the virtual power signals, and any signals generated during the course of synthesis. Any errors discovered can be corrected, followed by a re-synthesis. At step 203, also, electrical rule checks can be performed to verify that no improper connections in the virtual power signals are made.

At step 204, the functions of the MTCMOS circuit may be verified using logic simulation. At this step, the logic simulation may treat virtual power signals as logic signals to verify correct logic operations. Similarly, in steps 205 and 206, timing and power analyses of MTCMOS circuit can be performed taking advantage of the timing and power models for the virtual power signals, as discussed above.

The detailed description above is provided to illustrate the specific embodiments of the present invention and is not intended to be limited. Numerous modifications and variations within the scope of the present invention are possible.

I claim:

1. A design automation tool for use with a logic circuit, the design automation tool residing on a computer readable medium and comprising executable instructions for implementing:
   a model which attributes each signal of the logic circuit into one of the following: i) a logic signal; ii) a power signal; and iii) a virtual power signal; and
   an analysis tool capable of using the model to analyze the circuit, the analysis tool being configurable to analyze the logic circuit, alternatively, (a) treating a virtual power signal as a logic signal, or (b) treating a virtual power signal as a power signal.

2. A design automation tool as in claim 1, further comprising a timing model for the logic circuit incorporating the model for the virtual power signal, wherein the timing model relates a timing relationship between the virtual power signal to a logic signal.

3. A design automation tool as in claim 1, further comprising a power model for the logic circuit incorporating the model for the virtual power signal, wherein the power model relates a power consumption of the logic circuit to the active and inactive states of the virtual power signal.

4. A design automation tool as in claim 1, wherein the analysis tool comprises a formal verification tool for verifying the logic circuit against a synthesized power-gated circuit corresponding to the logic circuit.

5. A design automation tool as in claim 4, wherein the formal verification tool extracts from a model of the logic circuit from the synthesized power-gated circuit using the attribute to identify the virtual power signal.

6. A design automation tool as in claim 1, further comprising a power router which routes the virtual power signal in the logic circuit as a power rail.

7. A design automation tool as in claim 1, further comprising a signal router which routes the virtual power signal in the logic circuit as a signal.

8. A design automation tool as in claim 1, further comprising a second analysis tool, wherein the first analysis tool treats the virtual power signal as a power signal and the second analysis tool treats the virtual power signal as a power rail.

9. A method for analyzing a logic circuit comprising:
   providing a model which attributes each signal of the logic circuit into one of the following: i) a logic signal; ii) a power signal; and iii) a virtual power signal; and
   providing an analysis tool that uses the model to analyze the circuit, the analysis tool being executable by a computer and being configurable to analyze the logic circuit, alternatively, (a) treating a virtual power signal as a logic signal, or (b) treating a virtual power signal as a power signal.

10. A method as in claim 9, further comprising providing a timing model for the logic circuit incorporating the model for the virtual power signal, wherein the timing model relates a timing relationship between the virtual power signal to a logic signal.

11. A method as in claim 9, further comprising providing a power model for the logic circuit incorporating the model for the virtual power signal, wherein the power model relates a power consumption of the logic circuit to the active and inactive states of the virtual power signal.

12. A method as in claim 9 wherein the analysis tool comprises a formal verification tool for verifying the logic circuit against a synthesized power-gated circuit corresponding to the logic circuit.

13. A method as in claim 12, wherein the formal verification tool extracts from a model of the logic circuit from the synthesized power-gated circuit using the attribute to identify the virtual power signal.

14. A method as in claim 9, further comprising providing a power router which routes the virtual power signal in the logic circuit as a power rail.

15. A method as in claim 9, further comprising providing a signal router which routes the virtual power signal in the logic circuit as a signal.

16. A method as in claim 9, further comprising providing a second analysis tool, wherein the first analysis tool treats the virtual power signal as a power signal and the second analysis tool treats the virtual power signal as a power rail.

* * * * *